United States Patent
Tokura et al.

(10) Patent No.: US 10,315,527 B2
(45) Date of Patent: Jun. 11, 2019

(54) POWER RECEPTION COIL DEVICE AND WIRELESS POWER TRANSFER SYSTEM

(71) Applicant: IHI CORPORATION, Tokyo (JP)

(72) Inventors: Susumu Tokura, Tokyo (JP); Masakazu Hara, Tokyo (JP); Kentarou Furiya, Tokyo (JP); Jun Araki, Tokyo (JP)

(73) Assignee: IHI CORPORATION, Tokyo (JP)

(*) Notice: Subject to any disclaimer, the term of this patent is extended or adjusted under 35 U.S.C. 154(b) by 129 days.

(21) Appl. No.: 15/434,600

(22) Filed: Feb. 16, 2017

(65) Prior Publication Data

US 2017/0158066 A1 Jun. 8, 2017

Related U.S. Application Data

(63) Continuation of application No. PCT/JP2015/063009, filed on Apr. 30, 2015.

(30) Foreign Application Priority Data

Oct. 10, 2014 (JP) .................................. 2014-209001

(51) Int. Cl.
*H01F 27/42* (2006.01)
*H01F 38/00* (2006.01)
(Continued)

(52) U.S. Cl.
CPC .............. *B60L 11/182* (2013.01); *B60L 53/12* (2019.02); *H01F 27/362* (2013.01); *H01F 38/14* (2013.01);
(Continued)

(58) Field of Classification Search
CPC . H02J 50/90; H02J 50/12; H02J 7/025; B60L 11/182; H01F 38/14
See application file for complete search history.

(56) References Cited

U.S. PATENT DOCUMENTS 8,872,386 B2 * 10/2014 Mach ........................ H02J 5/00
307/104
2011/0127843 A1 * 6/2011 Karaoguz .......... G06K 7/10207
307/104
(Continued)

FOREIGN PATENT DOCUMENTS

CN 103339698 A 10/2013
EP 2667390 A1 11/2013
(Continued)

*Primary Examiner* — Alfonso Perez Borroto
*Assistant Examiner* — Esayas G Yeshaw
(74) *Attorney, Agent, or Firm* — Volpe and Koenig, P.C.

(57) ABSTRACT

A power reception coil device is a power reception coil device attached to a movable body, for wirelessly receiving power from a power transmission coil device, and includes a power reception coil portion including a conductive wire, and a nonmagnetic body disposed between the movable body and the power reception coil portion. The nonmagnetic body includes a first overhang protruding in a first direction outwardly from one end portion of a region onto which the power reception coil portion is projected in a second direction. The first direction is orthogonal to the second direction in which the power reception coil device opposes the power transmission coil device. The first overhang is longer than or equal to a maximum permissible misalignment permissible between the power reception coil portion and a power transmission coil portion of the power transmission coil device.

8 Claims, 8 Drawing Sheets

(51) Int. Cl.
  *B60L 11/18* (2006.01)
  *H02J 50/90* (2016.01)
  *H02J 50/12* (2016.01)
  *H01F 38/14* (2006.01)
  *H02J 7/02* (2016.01)
  *H01F 27/36* (2006.01)
  *B60L 53/12* (2019.01)

(52) U.S. Cl.
  CPC .............. *H02J 7/025* (2013.01); *H02J 50/12* (2016.02); *H02J 50/90* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2012/0049643 A1* | 3/2012 | Ryu | H04B 5/0037 307/104 |
| 2012/0153739 A1* | 6/2012 | Cooper | H02J 5/005 307/104 |
| 2012/0294045 A1* | 11/2012 | Fornage | H02M 7/217 363/17 |
| 2014/0008995 A1 | 1/2014 | Kanno | |
| 2014/0084697 A1 | 3/2014 | Yasuda et al. | |
| 2014/0339923 A1* | 11/2014 | Simopoulos | H02J 5/005 307/149 |
| 2015/0137925 A1* | 5/2015 | Abe | H01F 38/14 336/57 |
| 2015/0236514 A1* | 8/2015 | Nomura | H02J 50/40 307/104 |
| 2015/0318709 A1* | 11/2015 | Jol | H02J 5/005 307/104 |
| 2016/0005532 A1 | 1/2016 | Terayama et al. | |
| 2016/0043565 A1* | 2/2016 | Asaoka | H02J 5/005 307/104 |
| 2016/0094050 A1* | 3/2016 | Shichino | H02J 17/00 307/104 |
| 2016/0250940 A1* | 9/2016 | Uejima | B60L 11/1833 701/22 |

FOREIGN PATENT DOCUMENTS

| | | |
|---|---|---|
| JP | 2011-049230 A | 3/2011 |
| JP | 2012-204469 A | 10/2012 |
| JP | 2014-096982 A | 5/2014 |
| JP | 2014-103735 A | 6/2014 |
| JP | 2014-166070 A | 9/2014 |
| JP | 2014-193056 A | 10/2014 |
| WO | 2013/099222 A1 | 7/2013 |
| WO | 2014/006685 A1 | 1/2014 |
| WO | 2014/132115 A2 | 9/2014 |
| WO | 2014/142233 A1 | 9/2014 |

* cited by examiner

POWER RECEPTION COIL DEVICE AND WIRELESS POWER TRANSFER SYSTEM

CROSS-REFERENCE TO RELATED APPLICATIONS

This application is a continuation application of International Application No. PCT/JP2015/063009, filed Apr. 30, 2015, which claims priority to Japanese Patent Application No. 2014-209001, filed on Oct. 10, 2014. The contents of these applications are incorporated herein by reference in their entirety.

TECHNICAL FIELD

The present disclosure relates to a power reception coil device and a wireless power transfer system.

BACKGROUND ART

A wireless power transfer system includes a power transmission coil device and a power reception coil device, and implements wireless power transmission using electromagnetic induction, magnetic resonance, etc. between coils. For example, the wireless power transfer system is applied to a power feeding system of an electric vehicle or a plug-in hybrid vehicle. In this case, the power reception coil device is installed in a vehicle.

It has been known to dispose a conductive plate, etc. on a rear surface of the power reception coil device (that is, an opposite surface to a surface opposing the power transmission coil device, between the power reception coil device and the vehicle) (for example, see Patent Literature 1 and Patent Literature 2). A conductive plate described in Patent Literature 1 is provided to prevent leakage of a magnetic field to the outside. In this way, a magnetic flux generated from the power transmission coil device is prevented from passing through an iron plate as a floor of a vehicle. A metal frame described in Patent Literature 2 is provided to prevent the power reception coil device from being damaged by colliding with another object.

CITATION LIST

Patent Literature

Patent Literature 1: Japanese Unexamined Patent Publication No. 2014-96982
Patent Literature 2: International Unexamined Patent Publication No. 2013/099222

SUMMARY

Technical Problem

However, in Patent Literature 1, there is no investigation into a scheme of providing the conductive plate (for example, a size of the conductive plate, etc.) in terms of preventing the leakage of the magnetic field. In a case in which the power reception coil device is installed in a movable body of the vehicle, etc., even when the conductive plate is provided in the power reception coil device, there is a possibility that an iron plate of the movable body, etc. instead of the conductive plate may be present at a position opposing the power transmission coil device depending on a position at which the movable body stops. In this case, a magnetic flux from the power transmission coil device passes through the iron plate, etc., other than through the power reception coil device, to cause a decrease in power efficiency.

The present disclosure describes a power reception coil device and a wireless power transfer system capable of suppressing a decrease in power efficiency even when the power reception coil device is misaligned.

Solution to Problem

A power reception coil device according to one aspect of the disclosure is a power reception coil device attached to a movable body, for wirelessly receiving power from a power transmission coil device, the power reception coil device including a power reception coil portion including a conductive wire, and a nonmagnetic body disposed between the movable body and the power reception coil portion, wherein the nonmagnetic body includes a first overhang protruding in a first direction outwardly from one end portion of a region onto which the power reception coil portion is projected in a second direction, and the first direction is orthogonal to the second direction in which the power reception coil device opposes the power transmission coil device, and the first overhang is longer than or equal to a maximum permissible misalignment permissible between the power reception coil portion and a power transmission coil portion of the power transmission coil device.

According to this power reception coil device, the power reception coil device attached to the movable body wirelessly receives power from the power transmission coil device when the movable body stops at a predetermined position and the power reception coil device opposes the power transmission coil device. The nonmagnetic body disposed between the movable body and the power reception coil portion includes the first overhang protruding outwardly from the one end portion of the region onto which the power reception coil portion is projected in the second direction. The first overhang of the nonmagnetic body is longer than or equal to the maximum permissible misalignment. Thus, even when a misalignment corresponding to the maximum permissible misalignment occurs in the first direction, the nonmagnetic body faces the power transmission coil portion. Therefore, even when the power reception coil portion does not fully face the power transmission coil portion due to a misalignment of the power reception coil device occurring in the first direction, a magnetic flux from the power transmission coil portion may be inhibited from leaking to the movable body by the nonmagnetic body. As a result, the magnetic flux from the power transmission coil portion easily passes through the power reception coil portion, and a decrease in power efficiency may be suppressed.

In some aspects, a gap length corresponding to an interval in the second direction is formed between the power transmission coil portion and the power reception coil portion, and the first overhang is longer than or equal to a length obtained by adding the gap length to the maximum permissible misalignment. Swelling of a magnetic flux substantially corresponds to the gap length. Since the length of the first overhang of the nonmagnetic body includes the gap length, a magnetic flux corresponding to swelling may be inhibited from leaking to the movable body. According to this configuration, a magnetic flux may be further inhibited from leaking to the movable body.

In some aspects, the power reception coil portion is shorter than the power transmission coil portion in the first direction, one end portion of the power transmission coil portion protrudes from the one end portion of the power reception coil portion in a certain length when a center of the power reception coil portion in the first direction is aligned to a center of the power transmission coil portion in the first direction, and the first overhang is longer than or equal to a length obtained by adding the certain length to the maximum permissible misalignment and the gap length. When the power transmission coil portion is larger than the power reception coil portion in the first direction, the power transmission coil portion protrudes from the power reception coil portion in a certain length. The length of the first overhang of the nonmagnetic body includes the certain length. Thus, with regard to a magnetic flux formed to further protrude outward in the first direction from the power reception coil portion, when the power transmission coil portion protrudes, the magnetic flux may be inhibited from leaking to the movable body.

In some aspects, the nonmagnetic body further includes a second overhang protruding from the other end portion of the region in the first direction, and a length of the second overhang is set in the same manner as the length of the first overhang. According to this configuration, even when a misalignment occurs in any direction along the first direction, the length of the second overhang of the nonmagnetic body is set in the same manner as any one of the above aspects. Thus, a magnetic flux from the power transmission coil portion may be inhibited from leaking to the movable body.

In some aspects, the nonmagnetic body includes a whole circumferential overhang protruding from an outer periphery of the region across a whole circumference, and a length of the whole circumferential overhang is set in the same manner as the overhang length of the nonmagnetic body from the one end portion. According to this configuration, the length of the whole circumferential overhang of the nonmagnetic body is set in the same manner as any one of the above aspects irrespective of a direction in which a misalignment occurs, and thus a magnetic flux from the power transmission coil portion may be inhibited from leaking to the movable body.

In some aspects, the power reception coil portion includes a magnetic member, and is a solenoid type in which the conductive wire is wound around the magnetic member, and the one end portion of the region corresponds to one end portion of the magnetic member in the first direction. In this case, in the power reception coil portion of solenoid type, a magnetic flux from the power transmission coil portion easily passes through the magnetic member, and a decrease in power efficiency at the time of a misalignment may be suppressed.

In some aspects, the power reception coil portion is a circular type in which the conductive wire is wound around an axis along the second direction, and the one end portion of the region corresponds to an outer periphery of the conductive wire in the first direction. In this case, in the power reception coil portion of circular type, a magnetic flux from the power transmission coil portion easily passes through the conductive wire, and a decrease in power efficiency may be suppressed.

According to a wireless power transfer system including the above-described power reception coil device and the power transmission coil device opposing the power reception coil device to supply power to the power reception coil device, it is possible to suppress a decrease in power efficiency even when a misalignment occurs between the power transmission coil device and the power reception coil device.

Effects

According to some aspects of the disclosure, it is possible to suppress a decrease in power efficiency even when a power reception coil device is misaligned.

DESCRIPTION OF EMBODIMENTS

Figure 1:
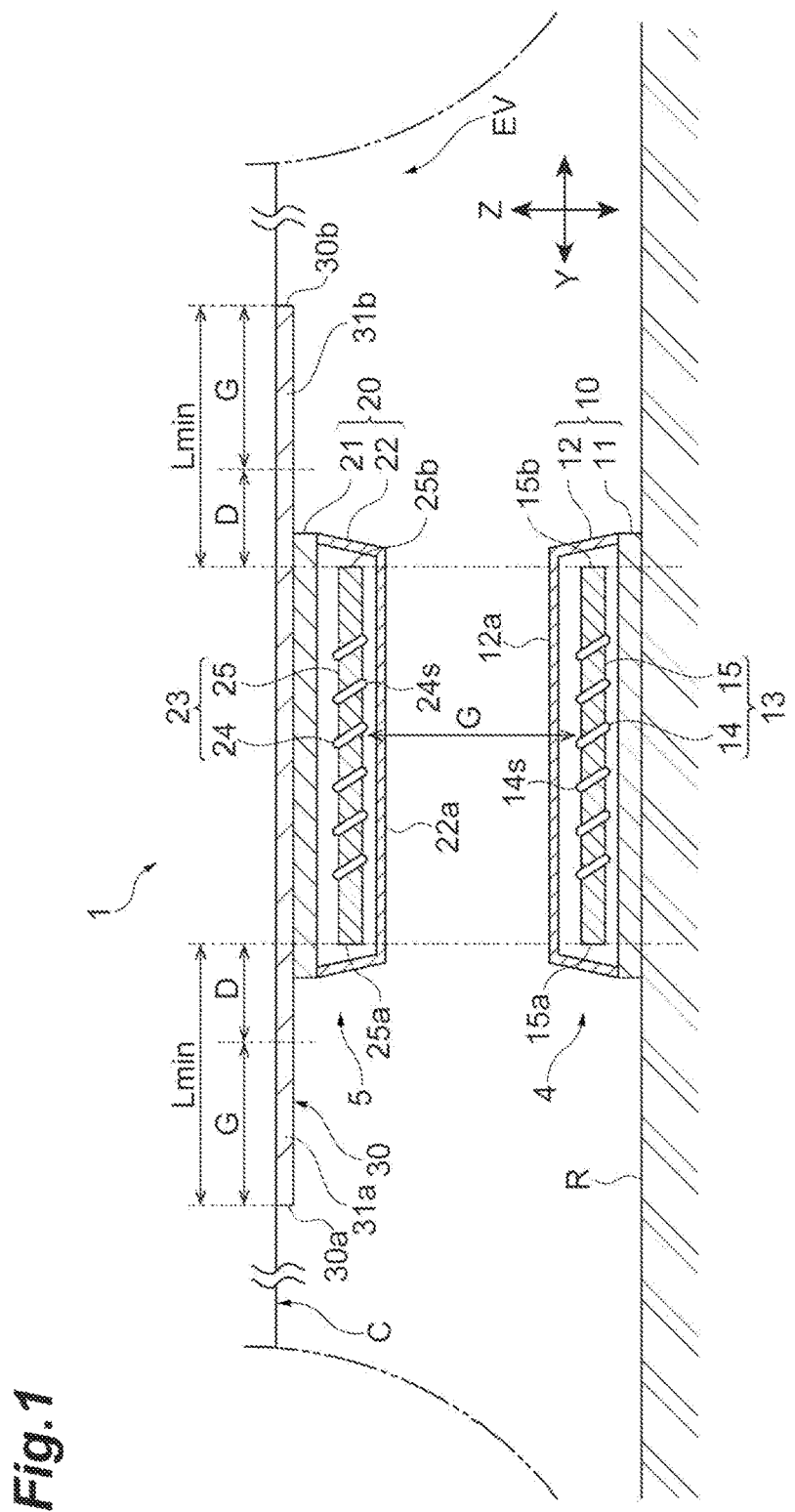
FIG. 1 is a side cross-sectional view schematically illustrating a wireless power transfer system according to a first embodiment of the disclosure.

Hereinafter, embodiments of the disclosure will be described with reference to drawings. In description of the drawings, the same reference numeral will be assigned to the same element, and a repeated description will be omitted. In addition, the respective drawings are prepared for description, and illustrated to particularly emphasize a part to be described. For this reason, a ratio of dimensions of respective members in the drawings may not be the same as an actual ratio. In description below, a left-right direction X, a front-rear direction Y, and vertical direction Z refer to directions based on an electric vehicle EV.

A description will be given of a wireless power transfer system 1 of the present embodiment and a power reception coil device 5 applied thereto with reference to FIG. 1. The wireless power transfer system 1 includes a power transmission coil device 4 and the power reception coil device 5, and is a system for wirelessly supplying power to the power reception coil device 5 from the power transmission coil device 4. The power transmission coil device 4 and the power reception coil device 5 are separated from each other in the vertical direction Z (an opposing direction, that is, a second direction). For example, the power transmission coil device 4 is installed on a road surface R of a parking lot, etc. For example, the power reception coil device 5 is installed in the electric vehicle (movable body) EV. The wireless power transfer system 1 is configured to supply power to the electric vehicle EV arriving at the parking lot, etc. using a magnetic coupling between coils of a magnetic resonance scheme, an electromagnetic induction scheme, etc.

The power transmission coil device 4 is provided to protrude upward from the road surface R. For example, the power transmission coil device 4 has a shape of a flat frustum or a rectangular parallelepiped. A controller, an inverter, etc. (not illustrated) is connected to the power transmission coil device 4. Desired AC power generated by a DC power source or an AC power source is sent to the power transmission coil device 4. When the AC power is sent to the power transmission coil device 4, the power transmission coil device 4 generates a magnetic flux. The power transmission coil device 4 may be buried in the road surface R rather than protruding from the road surface R.

The power transmission coil device 4 includes a flat plate-shaped power transmission coil portion 13 that generates a magnetic flux, and a housing 10 that accommodates the power transmission coil portion 13. For example, the housing 10, which is flat, includes a base 11 fixed to the road surface R and a protective cover 12 fixed to the base 11 to form an accommodation space between the protective cover 12 and the base 11. For example, the base 11 and the protective cover 12 are made of resin. Alternatively, the base 11 not opposing the power reception coil device 5 may be embodied using a nonmagnetic and conductive material (for example, aluminum).

The power transmission coil portion 13 includes a ferrite plate 15 corresponding to a rectangular plate-shaped magnetic member, and a conductive wire 14 wound around the ferrite plate 15. The conductive wire 14 corresponding to a litz wire is spirally wound around the ferrite plate 15. The conductive wire 14 may be directly wound around the ferrite plate 15, or wound around bobbins (winding plates) disposed on both surfaces of the ferrite plate 15. The power transmission coil portion 13 is a solenoid coil. In the present embodiment, the power transmission coil portion 13 is disposed such that a winding axis direction (left-right direction in the figure) is parallel to the front-rear direction Y, and a wound wire direction (direction vertical to paper) is parallel to the left-right direction X.

The power reception coil device 5 is attached to a bottom surface of a vehicle body (an iron chassis C, etc.) of the electric vehicle EV, and opposes the power transmission coil device 4 in the vertical direction (opposing direction) Z. A direction in which the power reception coil device 5 opposes the power transmission coil device 4 (the opposing direction) refers to a direction in which the power reception coil device 5 perpendicularly faces the road surface R on which the power transmission coil device 4 is provided. For this reason, in a case in which a misalignment occurs, the opposing direction is not a direction in which the power reception coil device 5 faces the power transmission coil device 4 obliquely with respect to the road surface R. For example, the power reception coil device 5 has a shape of a flat frustum or a rectangular parallelepiped. A controller, a rectifier, etc. (not illustrated) is connected to the power reception coil device 5. The power reception coil device 5 generates an induced current when a magnetic flux generated in the power transmission coil device 4 is interlinked with the power reception coil device 5. In this way, the power reception coil device 5 wirelessly receives power from the power transmission coil device 4. The power received by the power reception coil device 5 is supplied to a load (for example, a battery).

The power reception coil device 5 includes a flat plate-shaped power reception coil portion 23 that generates an induced current, and a housing 20 that accommodates the power reception coil portion 23. For example, the housing 20, which is flat, includes a base 21 fixed to the vehicle body of the electric vehicle EV and a protective cover 22 fixed to the base 21 to form an accommodation space between the protective cover 22 and the base 21. For example, the base 21 and the protective cover 22 are made of resin. Alternatively, the base 21 not opposing the power transmission coil device 4 may be embodied using a nonmagnetic and conductive material (for example, aluminum).

The power reception coil portion 23 includes a ferrite plate 25 corresponding to a rectangular plate-shaped magnetic member, and a conductive wire 24 wound around the ferrite plate 25. The conductive wire 24 corresponding to a litz wire is spirally wound around the ferrite plate 25. The conductive wire 24 may be directly wound around the ferrite plate 25, or wound around bobbins (winding plates) disposed on both surfaces of the ferrite plate 25. The power reception coil portion 23 is a solenoid coil. In the present embodiment, the power reception coil portion 23 is disposed such that a winding axis direction (left-right direction in the figure) is parallel to the front-rear direction Y, and a wound wire direction (direction vertical to paper) is parallel to the left-right direction X.

In the wireless power transfer system 1, a shape and a size of the power transmission coil portion 13 are equal to a shape and a size of the power reception coil portion 23. A common coil device may be used as the power transmission coil device 4 and the power reception coil device 5. When a center of the power reception coil device 5 in the front-rear direction Y is aligned to a center of the power transmission coil device 4 in the front-rear direction Y, positions of both end portions of the power transmission coil portion 13, that is, a front end portion 15a and a rear end portion 15b of the ferrite plate 15 in the front-rear direction Y are identical to positions of a front end portion 25a and a rear end portion 25b of the ferrite plate 25 in the front-rear direction Y. Further, a gap length G corresponding to an interval in the vertical direction Z is formed between a surface (that is, an upper surface on a surface 12a side of the protective cover 12) of the power transmission coil portion 13 of the power transmission coil device 4 and a surface (that is, a lower surface on a surface 22a side of the protective cover 22) of the power reception coil portion 23 of the power reception coil device 5. This gap length G is a minimum distance between the power transmission coil portion 13 and the power reception coil portion 23. In FIG. 1, the surface of the power transmission coil portion 13 and the surface of the power reception coil portion 23 defining the gap length G refer to a surface 14s of the conductive wire 14 of the power transmission coil portion 13 and a surface 24s of the conductive wire 24 of the power reception coil portion 23. In addition, it is presumed that the front end portion 15a and the rear end portion 15b of the ferrite plate 15 are bent to the power reception coil portion 23 side, the front end portion 25a and the rear end portion 25b of the ferrite plate 25 are similarly bent to the power transmission coil portion 13 side, and the minimum distance between the power transmission coil portion 13 and the power reception coil portion 23 is formed by the ferrite plates 15 and 25. In this case, the surface of the power transmission coil portion 13 and the surface of the power reception coil portion 23 defining the gap length may refer to the end portion 15a (or the end portion 15b) of the ferrite plate 15 of the power transmission coil portion 13 and the end portion 25a (or the end portion 25b) of the ferrite plate 25 of the power reception coil portion 23. For example, the gap length G may change according to a model, an automobile rank, etc. of the electric vehicle EV.

Herein, the power reception coil device 5 includes one aluminum plate 30 corresponding to a nonmagnetic body disposed between the vehicle body (the chassis C, etc.) of the electric vehicle EV and the power reception coil portion 23. The plate-shaped aluminum plate 30 is provided between the base 21 of the housing 20 and the iron chassis C (that is a rear surface side of the power reception coil portion 23). The aluminum plate 30 may be composed of one plate, or may be configured by combining a plurality of plates.

Figure 2:
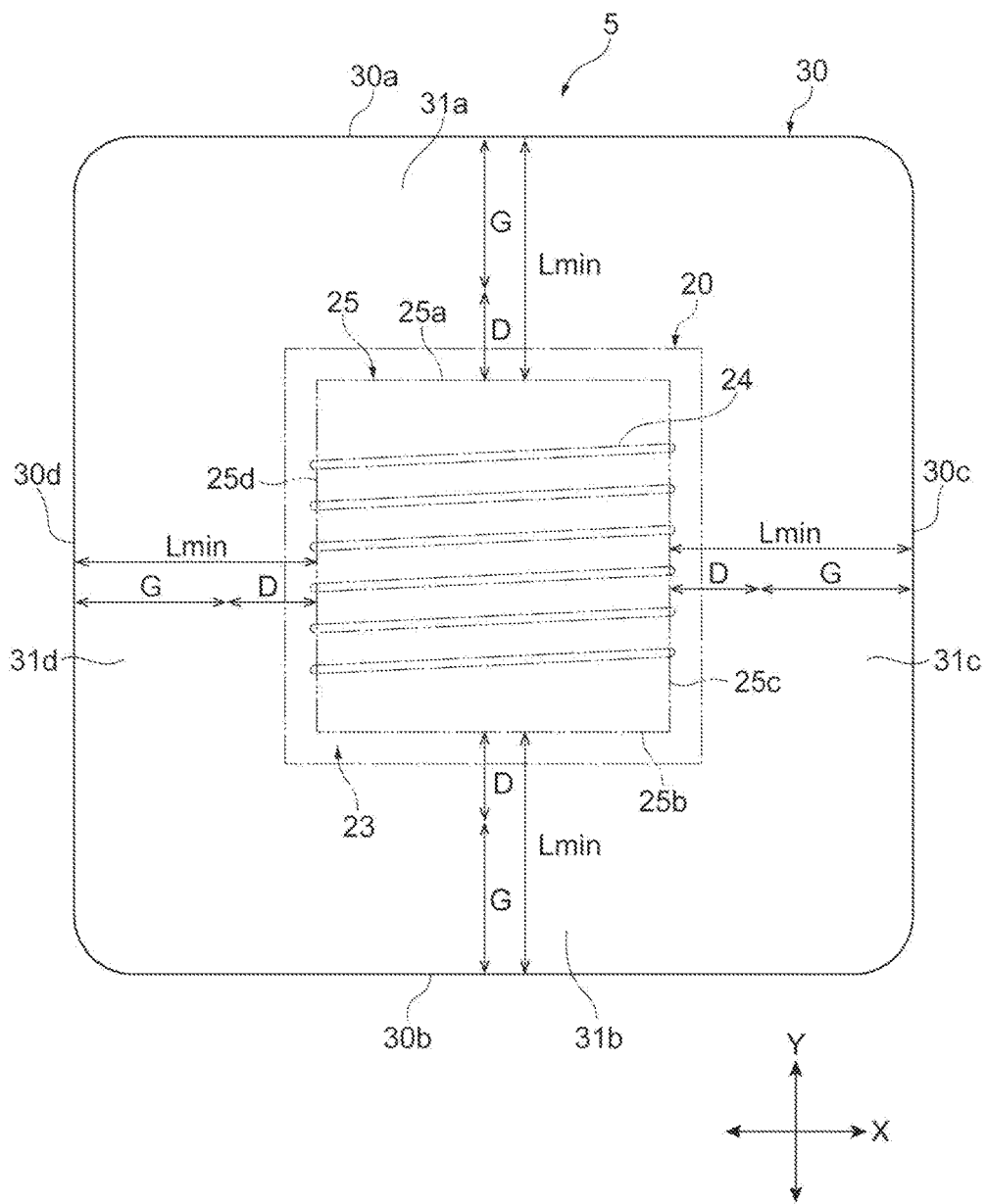
FIG. 2 is a plan view illustrating a power reception coil device of FIG. 1.

As illustrated in FIG. 1 and FIG. 2, the aluminum plate 30 protrudes outwardly from a rectangular region, in which the power reception coil portion 23 is provided, in the left-right direction X and the front-rear direction Y (a first direction). In other words, the aluminum plate 30 protrudes outward across a whole circumference from an outer periphery of the power reception coil portion 23 (that is, the front end portion 25a, the rear end portion 25b, a right end portion 25c, and a left end portion 25d illustrated in FIG. 2). In other words, the aluminum plate 30 includes overhangs 31a, 31b, 31c, and 31d protruding across the whole circumference (a whole circumferential overhang). In this way, when the power reception coil portion 23 is projected in the vertical direction Z, the aluminum plate 30 covers a projection range thereof. An area of the aluminum plate 30 is wider than a projection area of the power reception coil portion 23 in the vertical direction Z.

The aluminum plate 30 is a shield member provided to prevent a magnetic flux generated in the power transmission coil device 4 from leaking to the electric vehicle EV side. A possibility of a misalignment of the power reception coil device 5 with respect to the power transmission coil device 4 is considered in the aluminum plate 30. When the misalignment of the power reception coil device 5 with respect to the power transmission coil device 4 occurs, the aluminum plate 30 is provided within a range through which the magnetic flux generated in the power transmission coil device 4 can pass (that is, at which the magnetic flux can arrive).

A configuration of the aluminum plate 30 will be described in more detail with reference to FIG. 1 and FIG. 2. The aluminum plate 30 protrudes from a front end portion of the power reception coil portion 23, that is, the front end portion 25a (one end portion) of the ferrite plate 25 corresponding to the front end portion of the power reception coil portion 23 in the front-rear direction Y. In other words, the aluminum plate 30 includes the overhang 31a (first overhang) which protrudes outwardly from a front end portion of the projection range of the power reception coil portion 23. A length (overhang length) Lmin of the overhang 31a (a distance from the front end portion 25a to a front end portion 30a) corresponds to a sum of the above-described gap length G and a maximum permissible misalignment D permissible between the power reception coil portion 23 of the power reception coil device 5 and the power transmission coil portion 13 of the power transmission coil device 4. A forward overhang of the aluminum plate 30 may be longer than the overhang length Lmin. In other words, the forward overhang of the aluminum plate 30 may be longer than or equal to a length obtained by adding the gap length G to the maximum permissible misalignment D.

The aluminum plate 30 protrudes from a rear end portion of the power reception coil portion 23, that is, the rear end portion 25b (one end portion) of the ferrite plate 25 corresponding to the rear end portion of the power reception coil portion 23 in the front-rear direction Y. In other words, the aluminum plate 30 includes the overhang 31b (second overhang) which protrudes outwardly from a rear end portion of the projection range of the power reception coil portion 23. A length (overhang length) Lmin of the overhang 31b (a distance from the rear end portion 25b to a rear end portion 30b) corresponds to a sum of the above-described gap length G and a maximum permissible misalignment D. A rearward overhang of the aluminum plate 30 may be longer than the overhang length Lmin. In other words, the rearward overhang of the aluminum plate 30 may be longer than or equal to a length obtained by adding the gap length G to the maximum permissible misalignment D.

As illustrated in FIG. 2, an overhang length of the aluminum plate 30 in the left-right direction X is set in the same manner. That is, in the left-right direction X, the aluminum plate 30 protrudes from a right end portion of the power reception coil portion 23, that is, the right end portion 25c of the ferrite plate 25. The aluminum plate 30 protrudes from a left end portion of the power reception coil portion 23, that is, the left end portion 25d of the ferrite plate 25. In other words, the aluminum plate 30 includes the overhang 31c which protrudes outwardly from a right end portion of the projection range of the power reception coil portion 23. The aluminum plate 30 includes the overhang 31d which protrudes outwardly from a left end portion of the projection range of the power reception coil portion 23. Overhang lengths Lmin thereof (a distance from the right end portion 25c to a right end portion 30c and a distance from the left end portion 25d to a left end portion 30d) correspond to a sum of the above-described gap length G and a maximum permissible misalignment D permissible between the power reception coil portion 23 of the power reception coil device 5 and the power transmission coil portion 13 of the power transmission coil device 4. Rightward and leftward overhangs of the aluminum plate 30 may be longer than the overhang length Lmin. In other words, the rightward and leftward overhangs of the aluminum plate 30 may be longer than or equal to a length obtained by adding the gap length G to the maximum permissible misalignment D.

For example, the maximum permissible misalignment D is a maximum value of a misalignment determined in advance to be able to satisfy predetermined power efficiency. Specifically, power efficiency is measured in advance by changing a misalignment, and the maximum permissible misalignment D is a maximum value of a misalignment at which certain power efficiency or more is obtained. As another example of the maximum permissible misalignment D, for example, the maximum permissible misalignment D may be set to a maximum value of a misalignment at which a decrease in power efficiency with respect to maximum power efficiency is less than or equal to 5% or 10%. Power efficiency indicates a ratio of power at a place inside a power receiver including the power reception coil device 5 to power at a place inside a power transmitter including the power transmission coil device 4. For example, power efficiency is ratio of output power of a rectifier of the power receiver to input power to an inverter of the power transmitter. Herein, the inverter of the power transmitter generates desired AC power transmitted from the power transmission coil device 4 to the power reception coil device 5 from DC power (power obtained by rectifying an output from the DC power source or an output from the AC power source, etc.). The rectifier of the power receiver converts AC power received by the power reception coil device 5 into DC power (for example, power input to the battery).

In addition, the maximum permissible misalignment D may be defined as a maximum value of a misalignment, at which the power receiver including the power reception coil device 5 can supply predetermined power (for example, 3 kW) to a load connected to the power receiver, rather than predetermined power efficiency.

Further, another example of the maximum permissible misalignment D is a misalignment described in a specification, an operation manual, etc. of the wireless power transfer system 1 from a viewpoint of a usage mode of the wireless power transfer system 1 determined in advance. The maximum permissible misalignment D may change according to a model, an automobile rank, etc. of the electric vehicle EV. Examples thereof may include a numerical value such as 100 mm in the front-rear direction Y and 200 mm in the left-right direction X. In this case, the operation manual may have a description "Please use the wireless power transfer system such that a misalignment is within a range of 100 mm in the front-rear direction Y and 200 mm in the left-right direction X.", etc.

No misalignment may mean a positional relation between the power transmission coil device 4 and the power reception coil device 5 in which maximum power efficiency of the wireless power transfer system 1 is achieved. Alternatively, no occurring misalignment may mean that a center of a surface of the power transmission coil portion 13 in the front-rear direction Y is identical to a center of a surface of the power reception coil portion 23 in the front-rear direction Y in the vertical direction Z. Alternatively, no occurring misalignment may mean a positional relation between the power transmission coil device 4 and the power reception coil device 5 defined as no misalignment in the specifications, the operation manual, etc. of the wireless power transfer system 1. A deviation from a reference position indicating no misalignment is set as a misalignment.

Separate numerical values may be set in the front-rear direction Y and the left-right direction X as the maximum permissible misalignment D. In a movable body running in the front-rear direction Y such as the electric vehicle EV, the maximum permissible misalignment D in the front-rear direction Y (winding axis direction of the power reception coil device 5) may be determined to be smaller than the maximum permissible misalignment D in the left-right direction X (wound wire direction of the power reception coil device 5).

An overhang length of the aluminum plate 30 in each of the front-rear direction Y and the left-right direction X is set within a range through which a magnetic flux generated in the power transmission coil device 4 can pass when a misalignment of the power reception coil device 5 with respect to the power transmission coil device 4 occurs. That is, the aluminum plate 30 terminates in a range at which the magnetic flux from the power transmission coil device 4 can arrive when a misalignment less than or equal to the maximum permissible misalignment D occurs (is provided only within the range), and does not extend up to a range at which the magnetic flux from the power transmission coil device 4 does not arrive.

Figure 3:
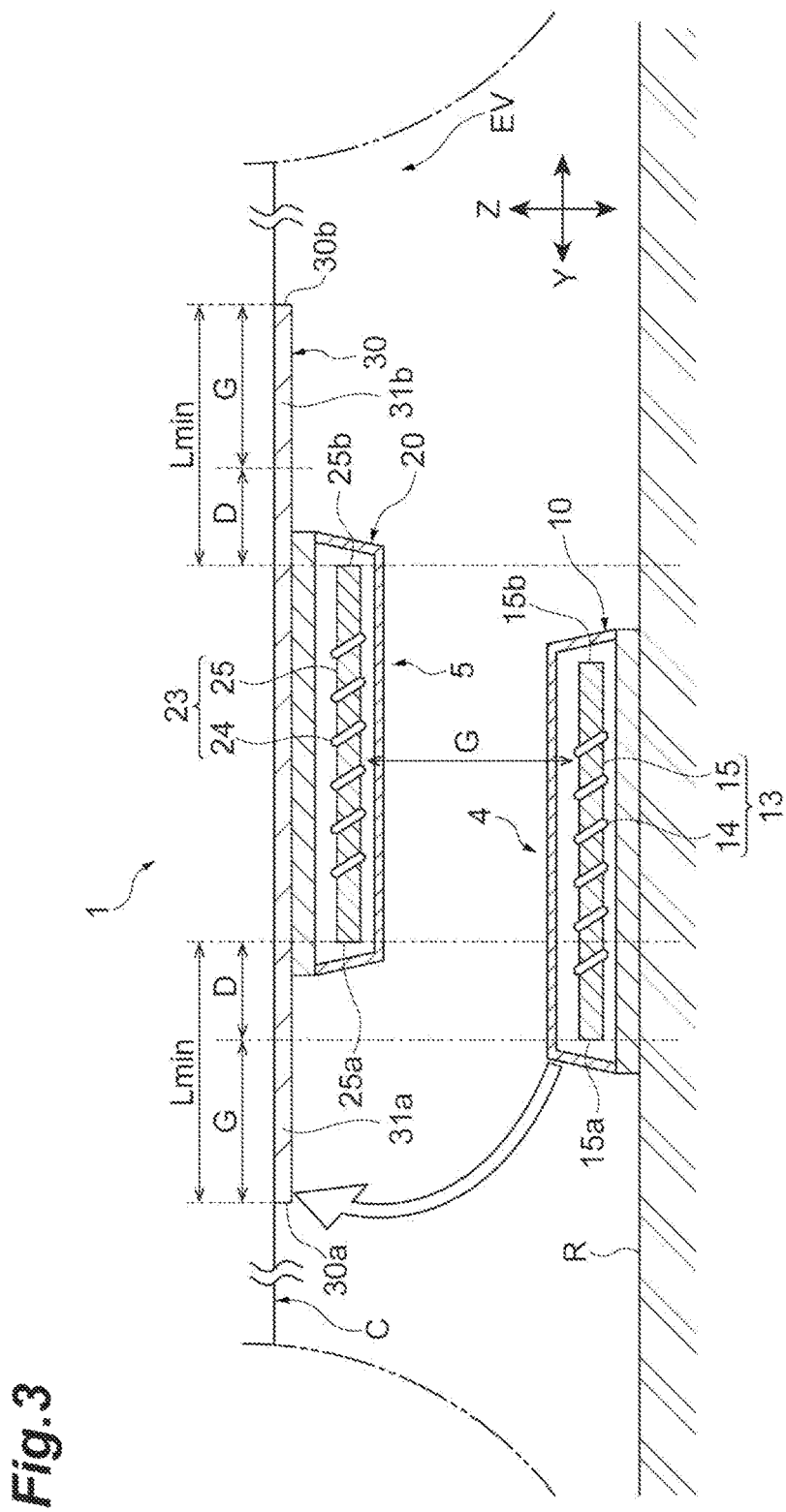
FIG. 3 is a side cross-sectional view illustrating a state in which a misalignment occurs in the wireless power transfer system of FIG. 1.

According to the wireless power transfer system 1 and the power reception coil device 5, even when a misalignment corresponding to the maximum permissible misalignment D occurs in the front-rear direction Y as illustrated in FIG. 3, the aluminum plate 30 faces the power transmission coil device 4. Therefore, even when the power reception coil portion 23 does not fully face the power transmission coil portion 13 due to occurrence of a misalignment of the power reception coil device 5 in the front-rear direction Y, a magnetic flux from the power transmission coil portion 13 is inhibited from leaking to the electric vehicle EV by shielding effect of the aluminum plate 30. As a result, the magnetic flux from the power transmission coil portion 13 easily passes through the power reception coil portion 23, and a decrease in power efficiency is suppressed.

Figure 4:
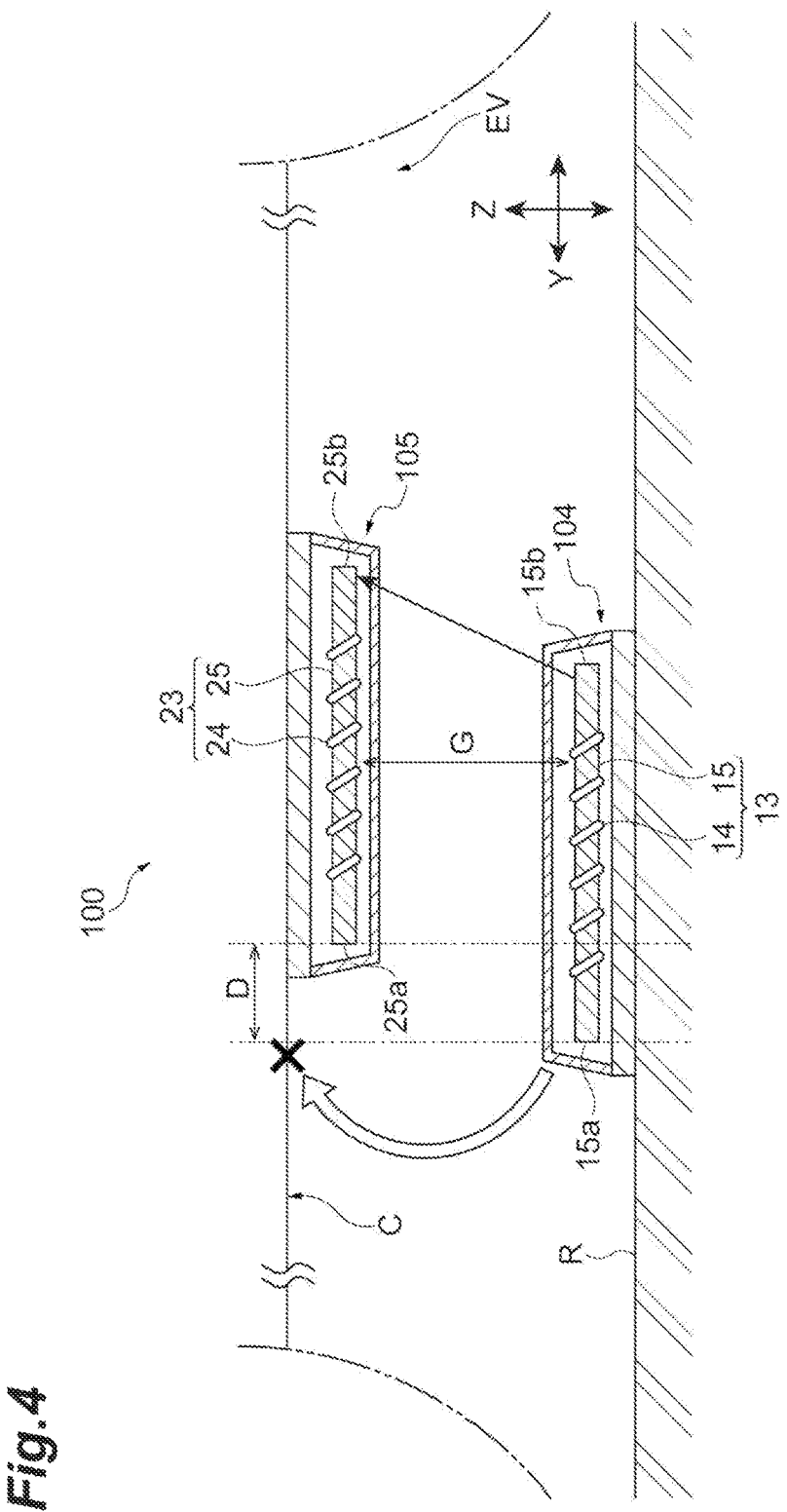
FIG. 4 is a side cross-sectional view illustrating a state in which a misalignment occurs in a conventional wireless power transfer system.

As illustrated in FIG. 4, in a conventional wireless power transfer system 100, a magnetic flux generated in a power transmission coil device 104 accumulates in the chassis C of the electric vehicle EV when a misalignment corresponding to a maximum permissible misalignment D occurs. As a result, the number of magnetic fluxes interlinked with the power reception coil device 105 decreases, and power efficiency decreases. According to the wireless power transfer system 1 and the power reception coil device 5 of the present embodiment, even when a misalignment corresponding to a maximum permissible misalignment D occurs, it is possible to ensure magnetic fluxes interlinked with the power reception coil device 105, and to suppress a decrease in power efficiency.

Furthermore, the overhang length of the aluminum plate 30 is a length including the gap length G. Herein, swelling of a magnetic flux substantially corresponds to the gap length G. Therefore, a magnetic flux corresponding to swelling may be inhibited from leaking to the electric vehicle EV. According to this configuration, a magnetic flux may be further inhibited from leaking to the electric vehicle EV.

In addition, the aluminum plate 30 protrudes from the ferrite plate 25 at both a front and a rear. Therefore, even when a misalignment occurs in one of a forward direction and a backward direction, a magnetic flux may be inhibited from leaking from the power transmission coil portion 13 to the electric vehicle EV by the aluminum plate 30 protruding in a predetermined overhang length.

Further, the aluminum plate 30 protrudes across a whole circumference of the ferrite plate 25. Therefore, even when a misalignment occurs in one of forward, backward, leftward, and right directions, a magnetic flux from the power transmission coil portion 13 may be inhibited from leaking to the electric vehicle EV by the aluminum plate 30 protruding in a predetermined overhang length.

When the solenoid type power reception coil portion 23 such as the power reception coil device 5 is adopted, a magnetic flux from the power transmission coil portion 13 easily passes through the ferrite plate 25, and a decrease in power efficiency at the time of a misalignment may be suppressed.

In particular, in the above-described configuration in which the aluminum plate 30 terminates in a range to which a magnetic flux from the power transmission coil device 4 can arrive, an advantageous effect over the above-described invention disclosed in Patent Literature 2 is achieved. In Patent Literature 2, even though a metal frame between a power reception coil device and a vehicle body is described, there is no investigation into a size of the metal frame in terms of preventing a magnetic flux from the power transmission coil device 4 from passing through a chassis C. In the invention described in Patent Literature 2, far from disposing the metal frame in a range at which a magnetic flux can arrive, a side portion of the metal frame is disposed in a range at which a magnetic flux cannot arrive in order to suppress generation of heat due to a magnetic flux passing through the side portion of the metal frame. In other words, technical ideas of the present embodiment and the invention described in Patent Literature 2 cannot be conceived from each other. In the invention described in Patent Literature 2, as the metal frame becomes larger, the metal frame becomes more excellent such that the side portion of the metal frame is disposed far away. For this reason, regarding the invention described in Patent Literature 2, a size regulation of the metal frame is not studied where the metal frame is disposed in a range at which a magnetic flux can arrive at the time of a misalignment as in the present embodiment. In the present embodiment, the size of the aluminum plate 30 may be terminated in a range at which a magnetic flux from the power transmission coil device 4 can arrive. In this way, an eddy current generated when a magnetic flux passes through the aluminum plate 30 may be prevented from becoming excessively large, and heat loss may be suppressed. In the invention described in Patent Literature 2, as the metal frame becomes larger, the metal frame becomes more excellent, and thus an eddy current passing through a planar portion (a portion other than the side portion) of the metal frame 37 becomes large.

A description will be given of a wireless power transfer system 1A according to a second embodiment with reference to FIG. 5. The wireless power transfer system 1A is different from the wireless power transfer system 1 of the first embodiment in that a power transmission coil device 4A larger than the power reception coil device 5 is included in place of the power transmission coil device 4 having the same shape and the same size as those of the power reception coil device 5. A power transmission coil portion 13A of the power transmission coil device 4A is larger than the power reception coil portion 23 of the power reception coil device 5. A housing 10A of the power transmission coil device 4A is larger than the housing 20 of the power reception coil device 5. In other words, a ferrite plate 25 of a power reception coil device 5 is smaller (shorter in the front-rear direction Y) than a ferrite plate 15A of the power transmission coil device 4A around which a conductive wire 14A is wound. Therefore, when a center of the power reception coil device 5 in the front-rear direction Y is aligned to a center of the power transmission coil device 4A in the front-rear direction Y (see FIG. 5), each of both end portions of the power transmission coil portion 13A, that is, a front end portion 15a and a rear end portion 15b of the ferrite plate 15A protrudes in a certain length S from the front end portion 25a and the rear end portion 25b of the ferrite plate 25.

An overhang length Lmin of an aluminum plate 30A at each of a front and a rear corresponds to a length obtained by adding a certain length S to a maximum permissible misalignment D and a gap length G. An overhang of an aluminum plate 30A may be longer than the overhang length Lmin. In other words, forward and rearward overhangs of the aluminum plate 30A may be longer than or equal to the length obtained by adding the certain length S to the maximum permissible misalignment D and the gap length G As described above, when the power transmission coil device 4A is larger than the power reception coil device 5 in the front-rear direction Y, the power transmission coil device 4A protrudes from the power reception coil device 5 in the certain length S when viewed in the vertical direction Z. According to this configuration, it is possible to suppress a variation in a distance between magnetic poles of the power transmission coil device 4A and the power reception coil device 5 (the ferrite plate 15A and the ferrite plate 25) at the time of a misalignment, and a decrease in power efficiency is suppressed. Further, the overhang length of the aluminum plate 30 includes the certain length S. Thus, with regard to a magnetic flux formed to further protrude outward in the front-rear direction Y from the power reception coil portion 23 when the power transmission coil portion 13A protrudes, the magnetic flux may be inhibited from leaking to the electric vehicle EV and efficiently interlinked with the power reception coil device 5.

Figure 6:
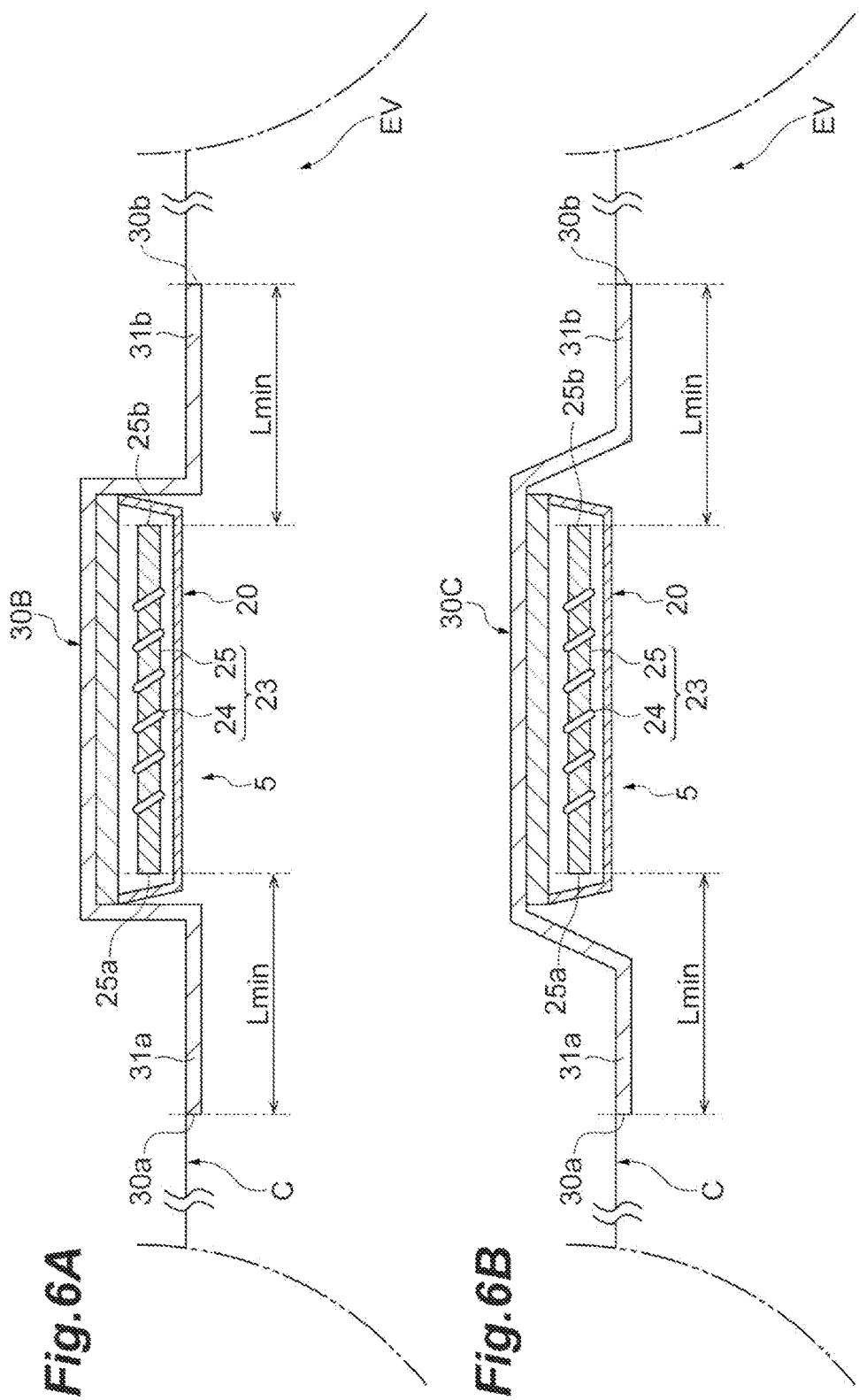
FIGS. 6A and 6B are side cross-sectional views illustrating other examples of the power reception coil device.

An example below may be considered as a modified example of the first embodiment and the second embodiment. For example, as illustrated in FIG. 6A, it is possible to employ a structure in which the power reception coil device 5 is buried in a rectangular parallelepiped-shaped cavity formed in the chassis C of the electric vehicle EV. In this case, the power reception coil device 5 stays at a higher position than a minimum ground height of the electric vehicle EV. An overhang length Lmin of an aluminum plate 30B provided on a rear surface side of the power reception coil device 5 in the front-rear direction Y (and the left-right direction X) may be set in the same manner as the overhang length Lmin of each of the above-described embodiments.

Alternatively, as illustrated in FIG. 6B, it is possible to employ a structure in which the power reception coil device 5 is buried in a truncated square pyramid-shaped cavity formed in the chassis C of the electric vehicle EV. In this case, the power reception coil device 5 stays at a higher position than a minimum ground height of the electric vehicle EV. An overhang length Lmin of an aluminum plate 30C provided on a rear surface side of the power reception coil device 5 in the front-rear direction Y (and the left-right direction X) may be set in the same manner as the overhang length Lmin of each of the above-described embodiments. It is possible to employ a nonmagnetic body such as the above-described aluminum plate 30B or 30C which does not have a flat plate shape and in which a depression accommodating the power reception coil device 5 is formed. In this case, sizes obtained when the aluminum plates 30B and 30C are projected in the vertical direction Z (that is, the overhang lengths) rather than lengths in which the aluminum plates 30B and 30C extend are significant in terms of preventing a magnetic flux leakage.

Figure 7:
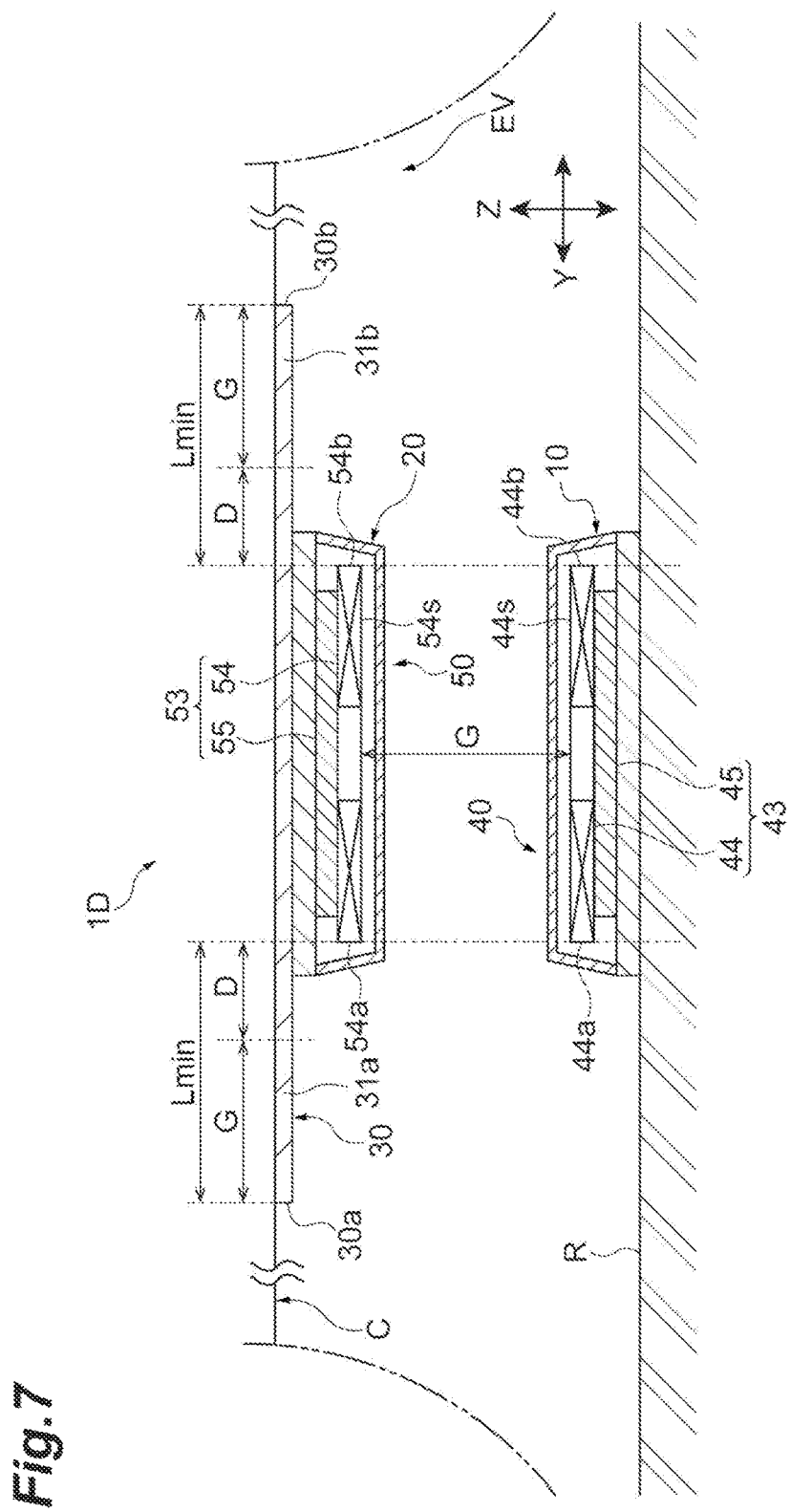
FIG. 7 is a side cross-sectional view schematically illustrating a wireless power transfer system according to a third embodiment of the disclosure.
Figure 8:
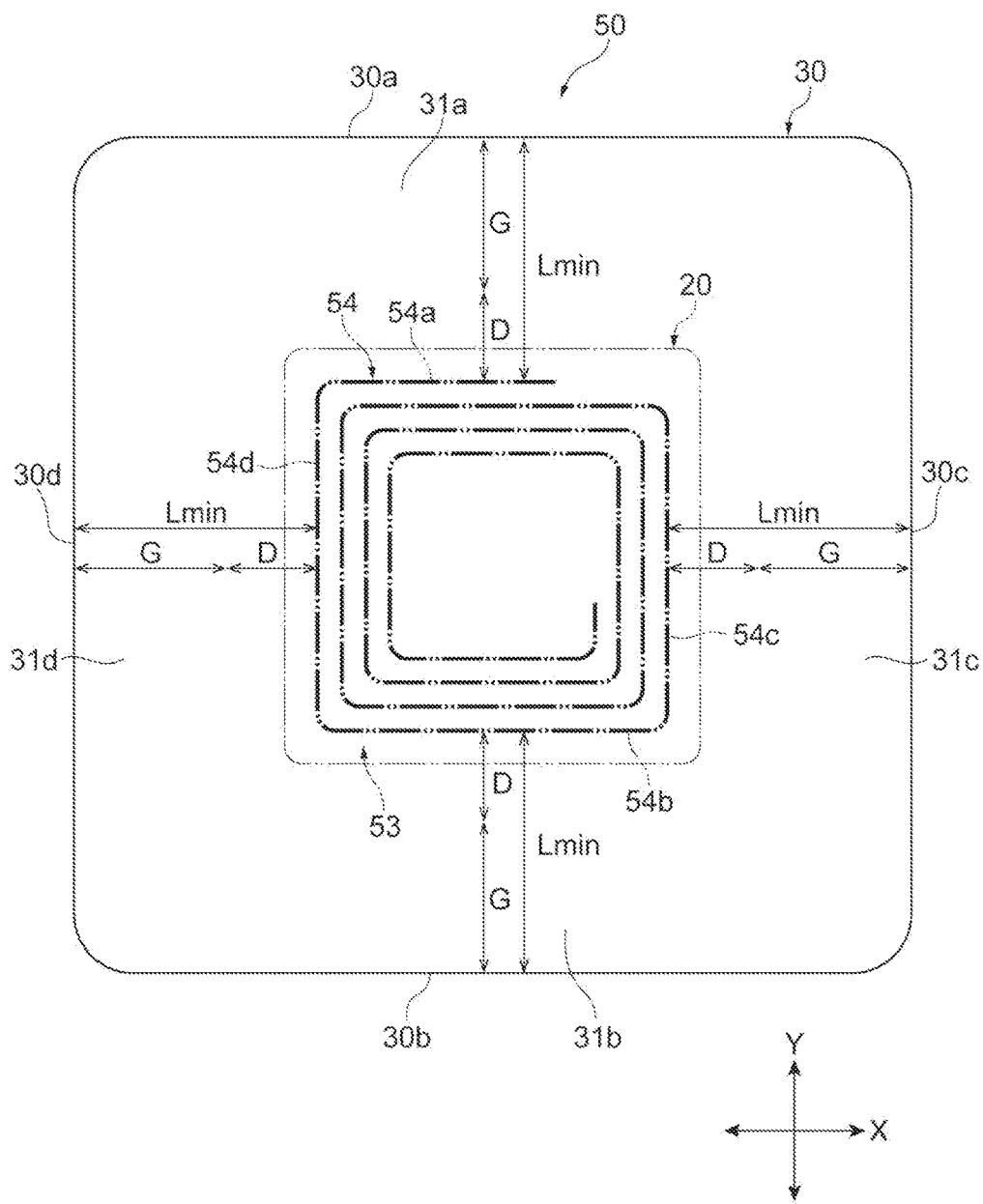
FIG. 8 is a plan view illustrating a power reception coil device of FIG. 7.

A description will be given of a wireless power transfer system 1D according to a third embodiment with reference to FIG. 7 and FIG. 8. The wireless power transfer system 1D is different from the wireless power transfer system 1 of the first embodiment in that a power transmission coil device 40 and a power reception coil device 50 which employ a power transmission coil portion 43 and a power reception coil portion 53 of circular type are included in place of the power transmission coil device 4 and the power reception coil device 5 which employ the power transmission coil portion 13 and the power reception coil portion 23 of solenoid type. A ferrite plate 45 and a rectangular and spiral conductive wire 44 fixed onto the ferrite plate 45 are accommodated in a housing 10 of the power transmission coil device 40. The ferrite plate 45 is provided on a rear surface side of the conductive wire 44. A ferrite plate 55 and a rectangular and spiral conductive wire 54 fixed onto the ferrite plate 55 are accommodated in a housing 20 of the power reception coil device 50. The ferrite plate 55 is provided on a rear surface side of the conductive wire 54. A shape and a size of the power transmission coil portion 43 are identical to a shape and a size of the power reception coil portion 53. When a center of the power reception coil device 50 in the front-rear direction Y is aligned to a center of the power transmission coil device 40 in the front-rear direction Y, positions of both end portions of the power transmission coil portion 43, that is, a front end portion 44a and a rear end portion 44b of the conductive wire 44 in the front-rear direction Y are identical to positions of a front end portion 54a and a rear end portion 54b of the conductive wire 54 in the front-rear direction Y.

In the wireless power transfer system 1D, an aluminum plate 30 of the power reception coil device 50 protrudes in the front-rear direction Y in an overhang length Lmin (or more) from a front end portion of the power reception coil portion 53, that is, the front end portion 54a (outer periphery) of the conductive wire 54 corresponding to the front end portion of the power reception coil portion 53. The aluminum plate 30 protrudes in the overhang length Lmin (or more) from a rear end portion of the power reception coil portion 53, that is, the rear end portion 54b (outer periphery) of the conductive wire 54 corresponding to the rear end portion of the power reception coil portion 53. In addition, the aluminum plate 30 protrudes in the left-right direction X in the overhang length Lmin (or more) from a right end portion of the power reception coil portion 53, that is, a right end portion 54c of the conductive wire 54. The aluminum plate 30 protrudes in the overhang length Lmin (or more) from a left end portion of the power reception coil portion 53, that is, a left end portion 54d of the conductive wire 54. In other words, the aluminum plate 30 includes overhangs 31a, 31b, 31c, and 31d (whole circumferential overhang) protruding across a whole circumference. A length (overhang length) Lmin of the whole circumferential overhang corresponds to a sum of a gap length G and a maximum permissible misalignment D permissible between the power reception coil portion 53 of the power reception coil device 50 and the power transmission coil portion 43 of the power transmission coil device 40. A gap length G in a circular coil is a distance between a surface 44s (an upper surface on the power reception coil device 50 side) of the conductive wire 44 of the power transmission coil portion 43 and a surface 54s (a lower surface on the power transmission coil device 40 side) of the conductive wire 54 of the power reception coil portion 53.

Even when the circular type power reception coil portion 53 is employed as in the power reception coil device 50, a magnetic flux from the power transmission coil portion 43 easily passes through the conductive wire 54, and a decrease in power efficiency at the time of a misalignment is suppressed.

The aluminum plate 30 protrudes across a whole circumference of the conductive wire 54. Therefore, even when a misalignment occurs in one of forward, backward, leftward, and right directions, a magnetic flux from the power transmission coil portion 43 may be inhibited from leaking to the electric vehicle EV by the aluminum plate 30 protruding in a predetermined overhang length.

Figure 5:
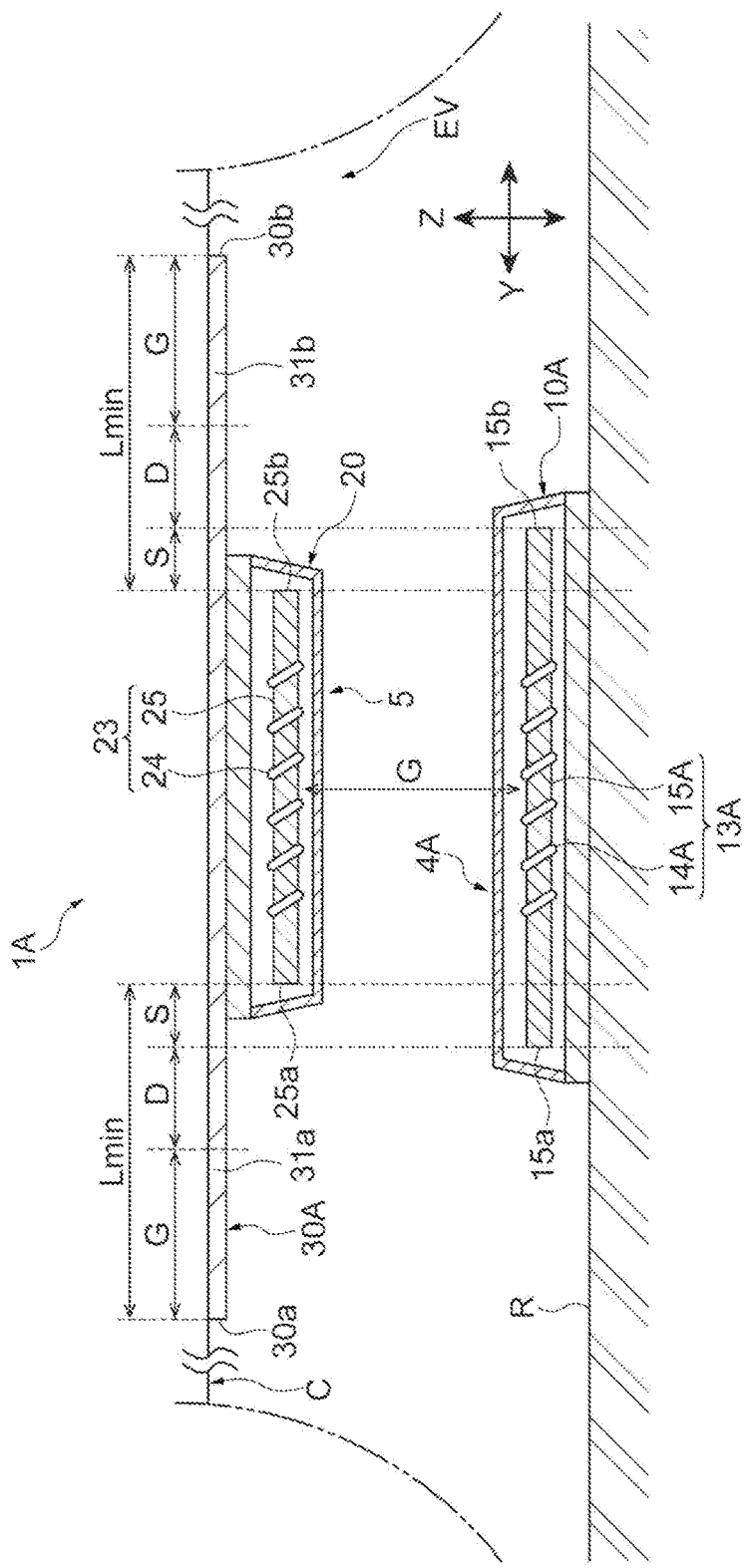
FIG. 5 is a side cross-sectional view schematically illustrating a wireless power transfer system according to a second embodiment of the disclosure.

In the power transmission coil portion 43 and the power reception coil portion 53 of circular type, when the power transmission coil portion 43 is larger than the power reception coil portion 53, the overhang length Lmin may be set to a length including a certain length S similarly to the wireless power transfer system 1A (see FIG. 5).

Hereinbefore, the embodiments of the disclosure have been described. However, the invention is not restricted to the embodiments. For example, the overhang length of the aluminum plate 30 may not include the gap length G. The aluminum plate 30 may protrude only forward or backward. That is, the aluminum plate 30 may include one, two, or three of the above-described overhangs 31a, 31b, 31c, and 31d. The aluminum plate 30 may protrude only rightward or leftward. Front and rear overhang lengths of the aluminum plate 30 may be different from each other. Right and left overhang lengths of the aluminum plate 30 may be different from each other.

When the power transmission coil portion 13 of the power transmission coil device 4 is larger than the power reception coil portion 23 of the power reception coil device 5, the overhang length of the aluminum plate 30 may not include the certain length S, and may not include the gap length G. When the aluminum plate 30 has a length at least including the maximum permissible misalignment D, a decrease in power efficiency may be suppressed even when a misalignment occurs.

When the solenoid type power reception coil portion is employed, the winding axis direction and the wound wire direction may be reversed from the above embodiments. That is, a direction in which the power reception coil device 5 is attached may be different by 90 degrees (or another arbitrary angle) around an axis in the vertical direction Z. When the power transmission coil device and the power reception coil portion of circular type are employed, a shape in which the conductive wire 54 is wound is not restricted to a rectangle and may be a circle. When the power transmission coil device and the power reception coil portion of circular type are employed, the ferrite plate may be omitted.

The nonmagnetic body is not restricted to the aluminum plate. For example, the nonmagnetic body may correspond to a copper plate, etc. The nonmagnetic body is not restricted to the rectangle. When an obstacle is present in the vehicle body (movable body), a notch, etc. may be appropriately provided in the nonmagnetic body. The nonmagnetic body is not restricted to the plate shape, and may correspond to a block shape. The nonmagnetic body may not be provided separately from the housing 20. For example, the base 21 of the housing 20 may be made of a nonmagnetic material, and the base 21 may protrude from a region of the power reception coil portion 23. The base 21 made of the nonmagnetic material and another nonmagnetic body disposed around the base 21 may be provided.

In the above embodiments, a description has been given of a case in which the magnetic member corresponds to the ferrite plates 15, 25, 45, and 55. However, the magnetic member is not restricted to the ferrite plates 15, 25, 45, and 55. The magnetic member may be embodied using another magnetic material (for example, a silicon steel plate, an amorphous magnetic alloy, or a magnet). The magnetic member may correspond to a soft magnetic material (ferrite, a silicon steel plate, or an amorphous magnetic alloy) in terms of improving power efficiency.

In the above embodiments, an example in which the litz wire is used as the conductive wires 14, 24, 44, and 54 has been described. However, the invention is not restricted thereto. The conductive wires 14, 24, 44, and 54 may correspond to conductive wires other than the litz wire as long as the conductive wires 14, 24, 44, and 54 function as coil devices for wireless power transfer. For example, a type, a form, a style, a material, a configuration, a shape, and dimensions of the conductive wires 14, 24, 44, and 54 may be appropriately selected.

The invention is not restricted to the vehicle body of the vehicle which runs on a ground, and may be applied to another movable body such as an underwater sailing body. That is, the invention may be applied to every movable body in which a misalignment between a power transmission coil device and a power reception coil device can occur.

In the drawings describing the above embodiments, the overhang 31a (description below is similarly applied to the overhangs 31b, 31c, and 31d) is represented as a flat surface. However, the invention is not restricted thereto. One or a plurality of depressions may be provided on the overhang 31a, and the overhang 31a may have an uneven surface. In particular, the depressions are provided on a surface of the overhang 31a opposing the power transmission coil devices 4, 4A, and 40. An eddy current flows in the overhang 31a when a magnetic flux is interlinked with the overhang 31a. However, a flow path of the eddy current increases by the depressions, and magnetic resistance increases. As a result, the eddy current rarely flows in the overhang 31a. Then, the number of eddy current-dependent magnetic fluxes that cancel out magnetic fluxes generated by the power transmission coil devices 4, 4A, and 40 decreases, and the number of magnetic fluxes interlinked with the power reception coil devices 5 and 50 increases. In this way, power efficiency is improved.

INDUSTRIAL APPLICABILITY

According to some aspects of the disclosure, it is possible to suppress a decrease in power efficiency even when a misalignment of a power reception coil device occurs.

The invention claimed is:

1. A power reception coil device attached to a movable body, for wirelessly receiving power from a power transmission coil device, the power reception coil device comprising:
   a power reception coil portion including a conductive wire; and
   a nonmagnetic body disposed between the movable body and the power reception coil portion,
   wherein the nonmagnetic body includes a first overhang protruding in a first direction outwardly from one end portion of a region onto which the power reception coil portion is projected in a second direction, and the first direction is orthogonal to the second direction in which the power reception coil device opposes the power transmission coil device, and
   the first overhang is longer than or equal to a maximum permissible misalignment permissible between the power reception coil portion and a power transmission coil portion of the power transmission coil device.

2. The power reception coil device according to claim 1, wherein a gap length corresponding to an interval in the second direction is formed between the power transmission coil portion and the power reception coil portion, and
   the first overhang is longer than or equal to a length obtained by adding the gap length to the maximum permissible misalignment.

3. The power reception coil device according to claim 2, wherein the power reception coil portion is shorter than the power transmission coil portion in the first direction,
   one end portion of the power transmission coil portion protrudes from the one end portion of the power reception coil portion in a certain length when a center of the power reception coil portion in the first direction is aligned to a center of the power transmission coil portion in the first direction, and
   the first overhang is longer than or equal to a length obtained by adding the certain length to the maximum permissible misalignment and the gap length.

4. The power reception coil device according to claim 1, wherein the nonmagnetic body further includes a second overhang protruding from the other end portion of the region in the first direction, and
   a length of the second overhang is set in the same manner as the length of the first overhang.

5. The power reception coil device according to claim 1, wherein the nonmagnetic body includes a whole circumferential overhang protruding from an outer periphery of the region across a whole circumference, and
   a length of the whole circumferential overhang is set in the same manner as the first overhang length of the nonmagnetic body from the one end portion.

6. The power reception coil device according to claim 1, wherein the power reception coil portion includes a magnetic member, and is a solenoid type in which the conductive wire is wound around the magnetic member, and
   the one end portion of the region corresponds to one end portion of the magnetic member in the first direction.

7. The power reception coil device according to claim 1, wherein the power reception coil portion is a circular type in which the conductive wire is wound around an axis along the second direction, and
   the one end portion of the region corresponds to an outer periphery of the conductive wire in the first direction.

8. A wireless power transfer system comprising:
   the power reception coil device according to claim 1; and
   the power transmission coil device opposing the power reception coil device to supply power to the power reception coil device.

* * * * *